US009279707B2

United States Patent
Wiest et al.

(10) Patent No.: US 9,279,707 B2
(45) Date of Patent: Mar. 8, 2016

(54) ULTRASONIC MULTIPATH FLOW MEASURING DEVICE ASCERTAINING WEIGHING FACTORS FOR MEASURING PATHS

(75) Inventors: Achim Wiest, Weil am Rhein (DE); Andreas Berger, Hasel-Glashutten (DE)

(73) Assignee: Endress + Hauser Flowtec AG, Reinach (CH)

( * ) Notice: Subject to any disclaimer, the term of this patent is extended or adjusted under 35 U.S.C. 154(b) by 164 days.

(21) Appl. No.: 14/117,105

(22) PCT Filed: Apr. 27, 2012

(86) PCT No.: PCT/EP2012/057797
§ 371 (c)(1),
(2), (4) Date: Nov. 12, 2013

(87) PCT Pub. No.: WO2012/156197
PCT Pub. Date: Nov. 22, 2012

(65) Prior Publication Data
US 2015/0160052 A1 Jun. 11, 2015

(30) Foreign Application Priority Data

May 17, 2011 (DE) .......................... 10 2011 075 997

(51) Int. Cl.
*G01F 1/66* (2006.01)

(52) U.S. Cl.
CPC .............. *G01F 1/662* (2013.01); *G01F 1/667* (2013.01); *Y10T 29/49826* (2015.01)

(58) Field of Classification Search
None
See application file for complete search history.

(56) References Cited

U.S. PATENT DOCUMENTS

| 4,103,551 A | 8/1978 | Lynnworth |
| 4,109,523 A | 8/1978 | Teyssandier |

(Continued)

FOREIGN PATENT DOCUMENTS

| CN | 1478194 A | 2/2004 |
| DE | 19808642 C1 | 8/1999 |
| EP | 0715155 A1 | 6/1996 |
| EP | 1255094 A2 | 11/2002 |

(Continued)

OTHER PUBLICATIONS

Thomas Tresch et al., "Comparison of Integration Methods for Multipath Acoustic Discharge Measurements", 6th International Conference on Innovation in Hydraulic Efficiency Measurements, Jul. 30, 2006, XP55040109, pp. 1-16.

(Continued)

*Primary Examiner* — Harshad R Patel
(74) *Attorney, Agent, or Firm* — Bacon & Thomas, PLLC

(57) ABSTRACT

A method for manufacturing an ultrasonic, flow measuring device, characterized by method steps as follows: selecting a number larger than one of straight subsections of the first signal path, which should have different distances from the measuring tube axis; establishing the distances of the straight subsections from measuring tube axis; calculating values of lengths of the straight subsections, as projected on the measuring tube axis, as a function of the number of straight subsections with the same distance from the measuring tube axis and the respective distances from the measuring tube axis; and inserting the at least a first reflection surface in the measuring tube such that the acoustic signal on the path from the first transmitter to the first receiver is so reflected on at least the first reflection surface that the first signal path comprises the straight subsections with the selected distances and the calculated values of the lengths as projected on the measuring tube axis.

13 Claims, 4 Drawing Sheets

(56) References Cited

U.S. PATENT DOCUMENTS

| | | | |
|---|---|---|---|
| 4,159,647 A * | 7/1979 | Paulsen et al. | 73/861.28 |
| 4,300,401 A | 11/1981 | Pedersen | |
| 4,317,178 A * | 2/1982 | Head | 702/47 |
| 6,089,104 A | 7/2000 | Chang | |
| 6,098,466 A | 8/2000 | Shkarlet | |
| 2003/0131667 A1 | 7/2003 | Gallagher | |
| 2006/0288798 A1* | 12/2006 | Kroemer et al. | 73/861.18 |
| 2007/0079660 A1 | 4/2007 | Feller | |
| 2007/0227249 A1* | 10/2007 | Meier et al. | 73/628 |
| 2014/0083202 A1* | 3/2014 | Wiest et al. | 73/861.27 |
| 2014/0144247 A1* | 5/2014 | Wiest et al. | 73/861.31 |

FOREIGN PATENT DOCUMENTS

| | | |
|---|---|---|
| WO | 95/12110 A1 | 5/1995 |
| WO | 0244662 A1 | 6/2002 |

OTHER PUBLICATIONS

International Search Report in corresponding International Application No. PCT/EP2012/057797, dated Oct. 18, 2012.

English translation of International Preliminary Examination Report in corresponding International Application No. PCT/ EP2012/ 057797, dated Nov. 28, 2013.

* cited by examiner

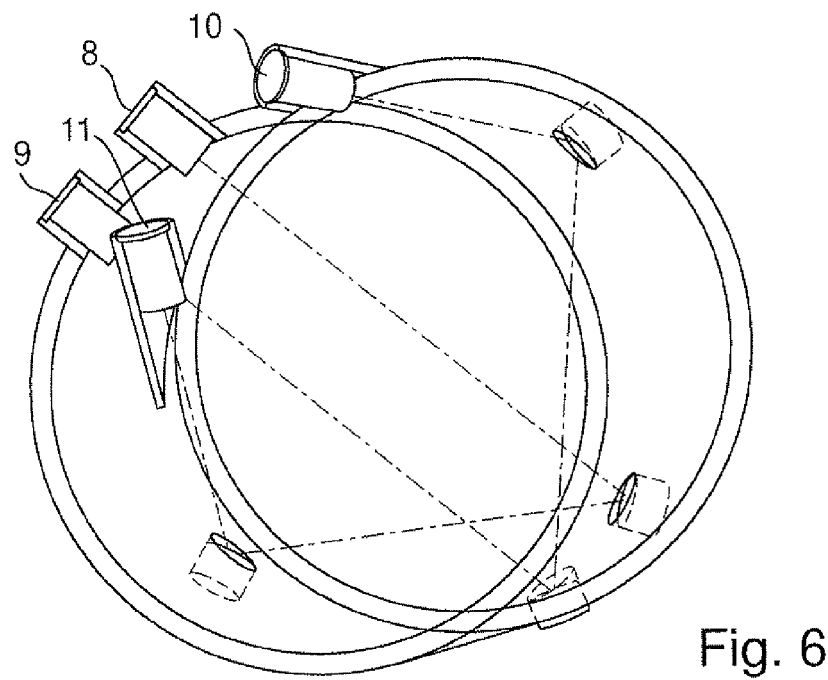
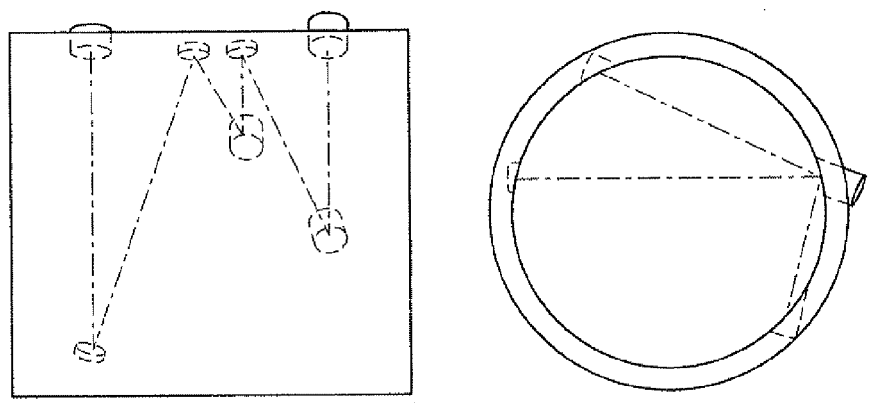
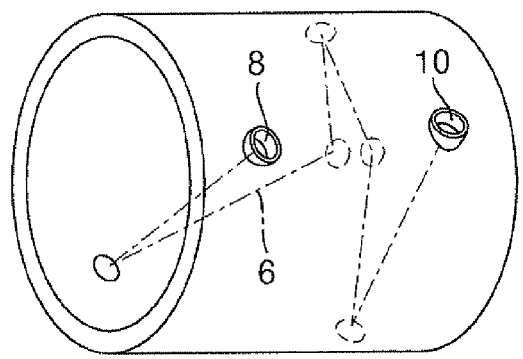
Fig. 6
Fig. 7

ULTRASONIC MULTIPATH FLOW MEASURING DEVICE ASCERTAINING WEIGHING FACTORS FOR MEASURING PATHS

TECHNICAL FIELD

The present invention relates to an ultrasonic, flow measuring device for flow measurement and includes a measuring tube having a straight measuring tube axis, a transmitter for sending an acoustic signal on a first signal path, a receiver for receiving the acoustic signal on the first signal path, and a first reflection surface, on which the acoustic signal on the first signal path is reflected, wherein the acoustic signal incident on the first reflection surface propagates along a first line, which has a first separation from the measuring tube axis.

BACKGROUND DISCUSSION

Ultrasonic, flow measuring devices are applied widely in process and automation technology. They permit easy determination of volume flow and/or mass flow in a pipeline.

Known ultrasonic, flow measuring devices frequently work according to the travel-time difference principle. In the travel-time difference principle, the different travel times of ultrasonic waves, especially ultrasonic pulses, i.e. so-called bursts, are evaluated as a function of the direction the waves travel in the flowing liquid. To this end, ultrasonic pulses are sent at a certain angle to the tube axis both with, as well as also counter to, the flow. From the travel-time difference, the flow velocity, and therewith, in the case of known diameter of the pipeline section, the volume flow, can be determined.

The ultrasonic waves are produced, respectively received, with the assistance of so-called ultrasonic transducers. To this end, ultrasonic transducers are placed securely in the tube wall of the relevant pipeline section. There are also clamp on, ultrasonic, flow measuring systems. In such case, the ultrasonic transducers are pressed externally on the wall of the measuring tube. A great advantage of clamp on, ultrasonic, flow measuring systems is that they do not contact the measured medium and can be placed on an already existing pipeline.

The ultrasonic transducers are normally composed of an electromechanical transducer element, e.g. a piezoelectric element, and a coupling layer. In the electromechanical transducer element, the ultrasonic waves are produced as acoustic signals and led via the coupling layer to the pipe wall and from there into the liquid in the case of clamp-on-systems, and, in the case of inline systems, via the coupling layer into the measured medium. In such case, the coupling layer is sometimes called a membrane.

Between the piezoelectric element and the coupling layer, another coupling layer can be arranged, a so called adapting, or matching, layer. The adapting, or matching, layer performs, in such case, the function of transmitting the ultrasonic signal and simultaneously reducing reflection at interfaces between two materials caused by different acoustic impedances.

Both in the case of clamp-on-systems, as well as also in the case of inline systems, the ultrasonic transducers are arranged on the measuring tube in a shared plane, either on oppositely lying sides of the measuring tube, in which case the acoustic signal, projected onto a tube cross section, passes once along a secant through the measuring tube, or on the same side of the measuring tube, in which case the acoustic signal is reflected on the oppositely lying side of the measuring tube, whereby the acoustic signal traverses the measuring tube twice along the secant projected on the cross section through the measuring tube. U.S. Pat. Nos. 4,103,551 and 4,610,167 show ultrasonic, flow measuring devices with reflections on reflection surfaces provided therefor in the measuring tube. Also known are multipath systems, which have a number of ultrasonic transducer pairs, which, in each case, form a signal path, along which the acoustic signals pass through the measuring tube. The respective signal paths and the associated ultrasonic transducers lie, in such case, in mutually parallel planes parallel to the measuring tube axis. U.S. Pat. Nos. 4,024,760 and 7,706,986 show such multipath systems by way of example. An advantage of multipath systems is that they can measure the profile of the flow of the measured medium in the measuring tube at a plurality of locations and thereby provide highly accurate, measured values for the flow. This is achieved based on, among other things, the fact that the individual travel times along the different signal paths are weighted differently. Disadvantageous in the case of multipath systems is, however, their manufacturing costs, since several ultrasonic transducers and, in given cases, a complex evaluating electronics need to be used.

There are different approaches for weighting the signal paths. The paper "Comparison of integration methods for multipath accoustic discharge measurements" by T. Tresch, T. Staubli and P. Gruber in the handout for the 6th International Conference on Innovation in Hydraulic Efficiency Measurements, 30 Jul. 1. Aug. 2006 in Portland, Or., USA, compares established methods for weighting the travel times along different signal paths for calculating the flow.

WO 1995012110 A1 discloses an ultrasonic, flow measuring device having a measuring tube with planar walls and a straight measuring tube axis and at least one reflection surface in the measuring tube, wherein a normal to this reflection surface has three components different from zero in a right angled coordinate system, whose one axis corresponds to the measuring tube axis. This document teaches that an ultrasonic signal of predetermined width, which is markedly greater than a point shaped signal, has a Gauss shaped sensitivity across this width. This signal is used for flow measurement. The width of the signal corresponds, in such case, approximately to the width of the rectangular measuring tube. If such a signal would pass through the measuring tube parallel to the side walls, the region with the highest sensitivity would extend through the center region of the measuring tube, and, thus, also record the higher flow velocities with higher values. In the case of very small flow velocities, this would lead to a measurement error. The document teaches consequently, further, to irradiate the measuring tube largely homogeneously by leading the ultrasonic signals through all regions of the measuring tube by means of directed reflections. For illustration, the broad ultrasonic signal was represented by individual beam portions. The path lengths of the individual beam portions are equally long, so that the beam portions do not cancel by interference.

SUMMARY OF THE INVENTION

An object of the invention is to provide an ultrasonic, flow measuring device, which ascertains flow highly accurately and also is cost effective to manufacture.

The object is achieved by an ultrasonic, flow measuring device of the invention which includes structural features as follows:
  a measuring tube having a straight measuring tube axis;
  a first transmitter for sending an acoustic signal on a first signal path;

a first receiver for receiving the acoustic signal on the first signal path; and a first reflection surface for reflecting the first acoustic signal on the first signal path.

It is manufacturable with a manufacturing process, which includes method steps as follows:

selecting a number larger than one of straight subsections of the first signal path, which should have different distances from the measuring tube axis;

establishing the distances of the straight subsections from the measuring tube axis;

ascertaining, for example, calculating, values of lengths of the straight subsections, as projected on the measuring tube axis, as a function of the number of straight subsections with the same separation from the measuring tube axis and respective separations from the measuring tube axis;

inserting the at least a first reflection surface in the measuring tube such that the acoustic signal on the path from the first transmitter to the first receiver is so reflected on at least the first reflection surface that the first signal path comprises the straight subsections with the selected distances and the calculated values of the lengths as projected on the measuring tube axis.

Serving both as transmitter as well as also receiver are usually ultrasonic transducers, especially electromechanical transducers, e.g. piezoelectric elements, which are suitable to send as well as also to receive the acoustic signal, especially an ultrasonic pulse or one or more ultrasonic waves. If ultrasonic transducers are applied as transmitters and receivers, the acoustic signal can pass along the first signal path back and forth, thus in two directions. Transmitter and receiver are, thus, exchangeable.

In an embodiment of the invention, the transmitter is suitable for receiving an acoustic signal on the first signal path and the receiver is suitable for sending the acoustic signal on the first signal path. The transmitter and receiver are ultrasonic transducers, especially ultrasonic transducers with electromechanical transducer elements, e.g. piezoelectric transducer elements.

Referred to as signal path, also called acoustic path, is the path of the acoustic signal, thus e.g. the ultrasonic wave or the ultrasonic pulse, between the transmitter, which transmits the acoustic signal, and the receiver, which receives the acoustic signal. In an embodiment of the invention, the acoustic signal is, such as usual in the case of an inline system, radiated perpendicularly to the membrane. The receiver is then so emplaced in or on the measuring tube that the signal, in turn, strikes perpendicularly on its membrane.

Used as an acoustic signal is especially a sound wave or a packet of sound waves. Serving as reflection surface is an interface, e.g. one formed between measured medium and measuring tube or a reflector arranged on or in the measuring tube. In an embodiment of the invention, the reflection surface is a surface of a reflector separately arranged in the measuring tube and contacting the measured medium during operation of the ultrasonic, flow measuring device.

In an embodiment of the invention, the acoustic signal is transmitted perpendicularly to a membrane of a first ultrasonic transducer serving as transmitter and received perpendicularly to a membrane of a second ultrasonic transducer serving as receiver, wherein the two ultrasonic transducers are so oriented relative to the reflection surface that the acoustic signal is reflected on the reflection surface to the second ultrasonic transducer.

The orientation of the reflection surface occurs e.g. via the angle bisector between the acoustic signal incident along the first line on the first signal path and the acoustic signal reflected along the second line on the first signal path. The angle bisector is the normal to the reflection surface. In an embodiment of the invention, the normal to the reflection surface does not intersect the measuring tube axis perpendicularly.

The separation of two lines is defined here as usual in mathematics. If two lines are skew to one another in space, the separation of the one line to an auxiliary plane parallel to it is calculated, in which plane the other line lies.

Two lines, which are not coincident, always have a separation relative to one another or a distance from one another. This is measured by the length of the normal lying between the two lines, perpendicular to both lines. Even for lines that are skew to one another, a normal exists. Therefore, a plane can be constructed, in which one line lies, and which is parallel to the other line. Thus, a first plane can be constructed, in which the first line lies and which is parallel to the measuring tube axis. Analogously, there exists a second plane parallel to the measuring tube axis in which the second line lies. According to the invention, the acoustic signal on the first signal path is reflected on the first reflection surface, wherein the acoustic signal incident on the first reflection surface propagates along the first straight subsection in a first plane parallel to the measuring tube axis, which first plane has the first separation from the measuring tube axis, and wherein the acoustic signal reflected on the first reflection surface propagates along the second straight subsection in a second plane parallel to the measuring tube axis, which second plane has the second separation from the measuring tube axis. The first plane would be tangent to a first straight circular cylinder with the first separation as radius of its base, along a line parallel to the measuring tube axis, which is part of its lateral surface, exactly as the second plane would be tangent to a second straight circular cylinder with the second separation as radius of its base. Both planes intersect in a line of intersection extending parallel to the measuring tube axis. The line of intersection lies, in such case, especially in the region of the first reflection surface. In the model on which this is based, the acoustic signals propagate along straight subsections. Therefore, the line of intersection of the first straight subsection and the second straight subsection would intersect the point of reflection of the acoustic signal on the first signal path on the reflection surface. Naturally, this is a model. In practice, the first signal path is not just a point wide and therefore the point of reflection is rather an area in the region of the reflection surface.

In a first embodiment of the invention, the measuring tube has an elliptical, especially circular, cross section, wherein the measuring tube axis then can also be referred to as the principal-, central- or longitudinal axis. The principal flow direction of the medium in the measuring tube coincides with the measuring tube axis.

In an additional embodiment of the invention, both the first separation as well as also the second separation is other than zero. In an additional embodiment, the dimensions of the measuring tube are a multiple of the dimensions of the ultrasonic transducer, respectively the transmitter and/or receiver. Thus, in the case of a round measuring tube and disk shaped transmitters and/or receivers, the diameter of the measuring tube is at least two times, especially five times, especially at least ten times, greater than the diameter of the disk of the transmitters and/or receivers. If the measuring tube has, for example, an angular, especially rectangular, especially square cross section, and/or the ultrasonic transducers as transmitter and/or receiver have some different shape, such as e.g. likewise rectangular, then the surface area of the cross section of the lumen of the measuring tube is at least four times greater than the surface area of the ultrasonic transducer, or even 25 times or even at least 100 times greater.

In an embodiment of the ultrasonic, flow measuring device of the invention, a travel-time difference method is used for flow measurement. The ultrasonic, flow measuring device of the invention is embodied correspondingly suitable therefor.

In a further development of the invention, the values of the lengths of the straight subsections as projected on the measuring tube axis are calculated as a function of the number of straight subsections with the same separation from the measuring tube axis and the respective separations from measuring tube axis in the following way:

ascertaining weighting factors for measuring paths of a multipath, ultrasonic, flow measuring device for flow measurement according to a predetermined calculational formula as a function of the distances of the measuring paths from the measuring tube axis, which distances from the measuring tube axis are the same as those of the straight subsections;

dividing the weighting factors by the number of measuring paths with the same separation from the measuring tube axis; and establishing the values of the lengths of the straight subsections, as projected on the measuring tube axis, having the same distances from the measuring tube axis, by dividing the results among the respectively provided number of straight subsections with the same distances from the measuring tube axis.

If of concern is a multipath, ultrasonic, flow measuring device with two or more measuring paths with the same separation from the measuring tube axis, the sum of the projected lengths of the straight subsections with the same distances from the measuring tube axis is proportional to the sum of the weighting factors of the said measuring paths; in such case, the individual subsections, respectively their lengths as projected on the measuring tube axis must not be equally long.

In an additional, further development of the invention, the predetermined calculational formula is the OWICS—or the Gauss-Jacobi method, or a comparable integral method, which can be performed especially by means of a CFD simulation.

In an additional, further development of the invention, there follows after the method step, "dividing the weighting factors by the number of measuring paths with the same separation from the measuring tube axis" and before the method step, "establishing the values of the lengths of the straight subsections having the same distances from the measuring tube axis and as projected on the measuring tube axis by dividing the results by the respectively provided number of straight subsections with the same distance from the measuring tube axis" a method step as follows:

normalizing the results with predetermined normalizing factors as a function of the lengths of the measuring paths as projected on the measuring tube axis and/or as a function of the distances from the measuring tube axis.

In an additional, further development, the normalizing of the results with predetermined normalizing factors occurs in the following way:

multiplying with the factor, $k_i = \sqrt{1-(d_i/D)^2}$, wherein $d_i$ stands for the distance from the measuring tube axis and D for the diameter of the measuring tube.

In an additional, further development of the invention, the at least a first reflection surface in the measuring tube is so applied that the acoustic signal on the first signal path from the first transmitter to the first receiver is so reflected on the at least a first reflection surface that the acoustic signal propagates through the measuring tube on the first signal path along at least a first and at least a second straight subsection, wherein the first straight subsection has a first separation from the measuring tube axis and the second straight subsection has a second separation from the measuring tube axis, wherein the first separation differs from the second separation, and wherein the sum of all lengths of all subsections of the first signal path as projected on the measuring tube axis and having the first separation from the measuring tube axis has a predetermined first value and wherein the sum of all lengths of all subsections of the first signal path as projected on the measuring tube axis and having the second separation from the measuring tube axis has a predetermined second value, wherein the first value differs from the second value, and wherein the first and the second value are other than zero. And/or, the at least a first reflection surface is so inserted into the measuring tube that the acoustic signal on the first signal path is reflected on the first reflection surface, wherein the acoustic signal incident on the first reflection surface propagates along the first straight subsection and wherein the acoustic signal reflected on the first reflection surface propagates along the second straight subsection.

Further developed, the ultrasonic, flow measuring device includes a plurality of reflection surfaces for reflection of the first acoustic signal on the first signal path.

In an additional, further development, the ultrasonic, flow measurement device includes at least one additional, second transmitter for sending an acoustic signal on a second signal path, at least one additional, second receiver for receiving the acoustic signal on the second signal path and at least one additional reflection surface for reflecting the acoustic signal on the second signal path, wherein the second signal path is established analogously to the first signal path. The method features concerning the first signal path are applied for establishing the second signal path. Only the label "first signal path" needs to be replaced with the label "second signal path".

Further developed, the reflection surfaces are so applied that the two signal paths extend in the measuring tube as mirror images of one another. And/or the transmitter, the receiver and reflection surfaces are so oriented relative to one another and arranged in the or on the measuring tube that the acoustic signal propagates on the first signal path from the first transmitter to the first receiver helically around the measuring tube axis In an additional embodiment, the reflection surfaces are so applied that the two signal paths can be made to coincide by a linear transformation of the one onto the other, e.g. a linear transformation such as a rotation, translation, reflection and combinations thereof.

In the case of increasing flow velocities, dispersions of the ultrasonic signal of the ultrasonic, flow measuring device can occur, which leads to a lessening of the signal strength. This effect can advantageously be corrected by one or more concave mirrors.

An ultrasonic, flow measuring device of the invention, as obtainable by the manufacturing process of the invention, includes, for example, other structural features, which are described in an additional patent application filed simultaneously with this patent application by the same assignee and bearing the title "ULTRASONIC, FLOW MEASURING DEVICE", to which reference is made herewith.

All embodiments can, unless stated to the contrary, be combined with one another.

BRIEF DESCRIPTION OF THE DRAWINGS

The invention permits numerous forms of embodiment. Some thereof will now be explained in greater detail based on the drawing. Equal elements are provided in the figures of the drawing with equal reference characters. The figures of the drawing show as follows:

FIG. 6 is perspectively, an ultrasonic, flow measuring device of the invention in an additional embodiment; and FIG. 7 is perspectively, an ultrasonic, flow measuring device of the invention in an additional embodiment both in longitudinal, as well as also in cross, section.

DETAILED DISCUSSION IN CONJUNCTION WITH THE DRAWINGS

Figure 1A:
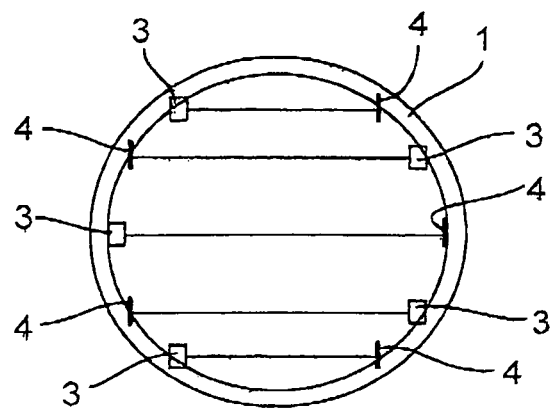
Fig. 1 is a multipath, ultrasonic, flow measuring device of the state of the art.
Figure 1B:
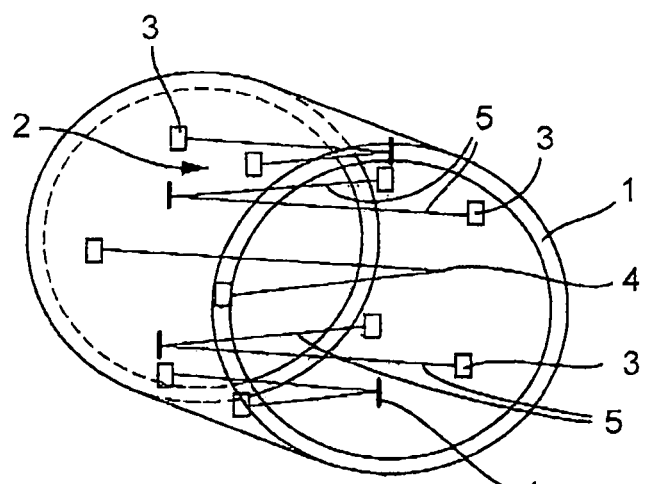

FIG. 1a shows a multipath, ultrasonic, flow measuring device of the state of the art in cross section through the measuring tube 1. FIG. 1b shows the same multipath, ultrasonic, flow measuring device perspectively. Both figures are taken from DE 10 2007 004 936 B4. The multipath, ultrasonic, flow measuring device includes, in such case, a measuring tube 1 and ten ultrasonic transducers 3, which together with five ultrasonic reflectors 4, form five V-shaped signal paths 5. In each case, two ultrasonic transducers 3 form an ultrasonic transducer pair 2. Each of the five V-shaped signal paths 5 is formed of two straight subsections, a first straight subsection from the first ultrasonic transducer 3 of its ultrasonic transducer pair 2 to the associated ultrasound reflector 4 and a second straight subsection from the associated ultrasound reflector 4 to the second ultrasonic transducer 3 of its ultrasonic transducer pair 2. Each of these ultrasonic transducer pairs 2 lies with the associated ultrasound reflector 4 in a plane, which has a predetermined separation from the measuring tube axis. Also, the two straight subsections of the respective V-shaped signal paths 5 lie in these, thus, five planes, which are spanned by the five V-shaped signal paths 5, and the five planes extend parallel to one another in the measuring tube.

Figure 2:
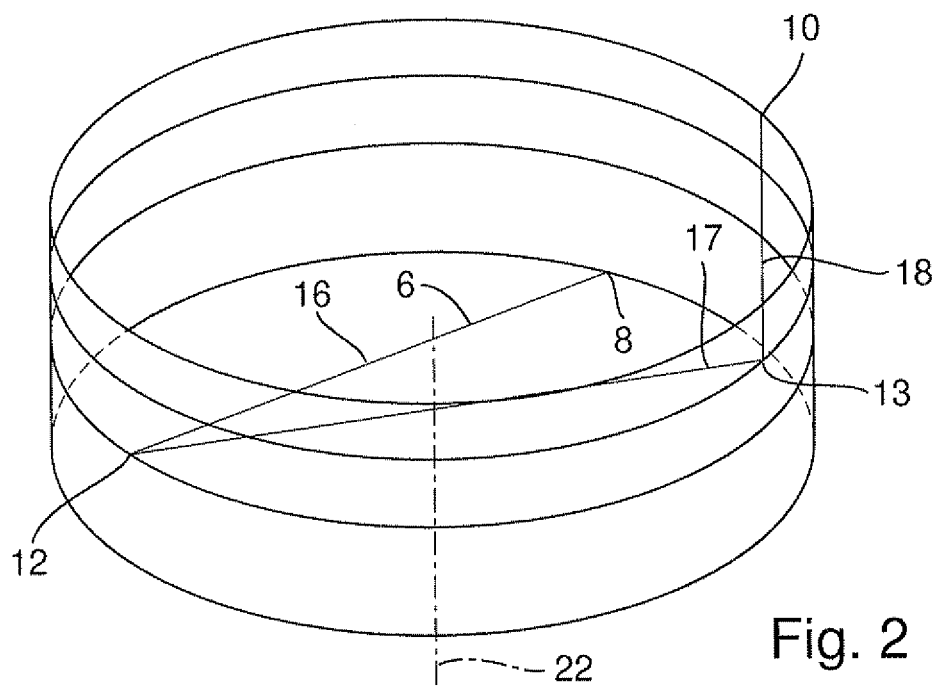
FIG. 2 is perspectively, an ultrasonic, flow measuring device of the invention.

FIG. 2 provides a strongly simplified model of the operation of an ultrasonic, flow measuring device of the invention. Shown are a measuring tube 1 and a first signal path 6. Indication of the ultrasonic transducers (transmitter and/or receiver) and the reflection surfaces has been omitted for reasons of perspicuity. Instead, as a simplification, only the intersections of the first signal path 6 with the measuring tube 1 at the effective locations of the transducers and reflectors are shown. Thus, the first transmitter 8 sends the acoustic signal on the first signal path 6 in the direction of the first reflection surface 12 along a first straight subsection 16. On the first reflection surface 12, the acoustic signal on the first signal path 6 is reflected toward the second reflection surface 13 along a second straight subsection 17, where it, finally, is reflected on a third straight subsection 18 of the first signal path 6 toward the first receiver 10. The first transmitter 8 lies, in such case, in a first plane perpendicular to the measuring tube axis 22. The first reflection surface 12 lies in a second plane perpendicular to the measuring tube axis 22. The second reflection surface 13 lies in a third plane perpendicular to the measuring tube axis 22, and the first receiver 10 lies in a fourth plane perpendicular to the measuring tube axis 22. The planes are, for reasons of simplicity, not sketched. Shown, however, are their circles of intersection with the measuring tube 1, on which circles of intersection lie, respectively, the first transmitter 8, the first receiver 10 and the first reflection surface 12 and the second reflection surface 13, respectively here in this model the intersections of the first signal path 6 with the measuring tube 1. The four parallel planes have predetermined distances from one another. Thus, the first subsection 16 has a first length with a value other than zero as projected on the measuring tube axis 22, while likewise the second and third subsections 17 and 18 have respectively second and third lengths projected on the measuring tube axis 22, which correspond to the separations of the planes.

Figure 3:
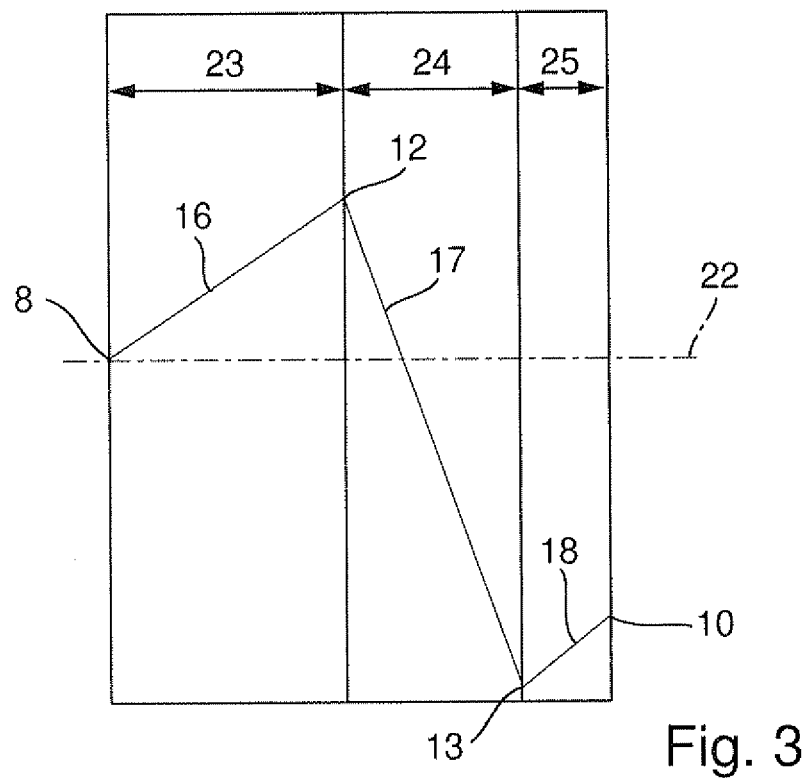
FIG. 3 is an ultrasonic, flow measuring device of the invention in longitudinal section.

The lengths of the subsections projected on the measuring tube axis 22 are shown in FIG. 3, which is a longitudinal section through the measuring tube 1. The acoustic signal on the first signal path experiences between the first transmitter 8 and the first receiver 10 two reflections, namely a first on the first reflection surface 12 and a second on the second reflection surface 13. Thus, the first signal path can be divided into three straight subsections 16, 17 and 18. Each of these has a length projected onto the measuring tube axis 22. The values of these lengths in this example of an embodiment are always other than zero. The first straight subsection 16 has a first length 23, the second subsection 17 a second length 24 and the third straight subsection 18 a third length 25, all as projected on the measuring tube axis 22.

The values of these lengths 23, 24 and 25 are according to the invention dependent on the respective separations of the respective straight subsection 16, 17 and 18 from the measuring tube axis 22. Here, the first value of the first length 23 is greater than the second value of the second length 24, which, in turn, is greater than the third value of the third length 25.

Figure 4:
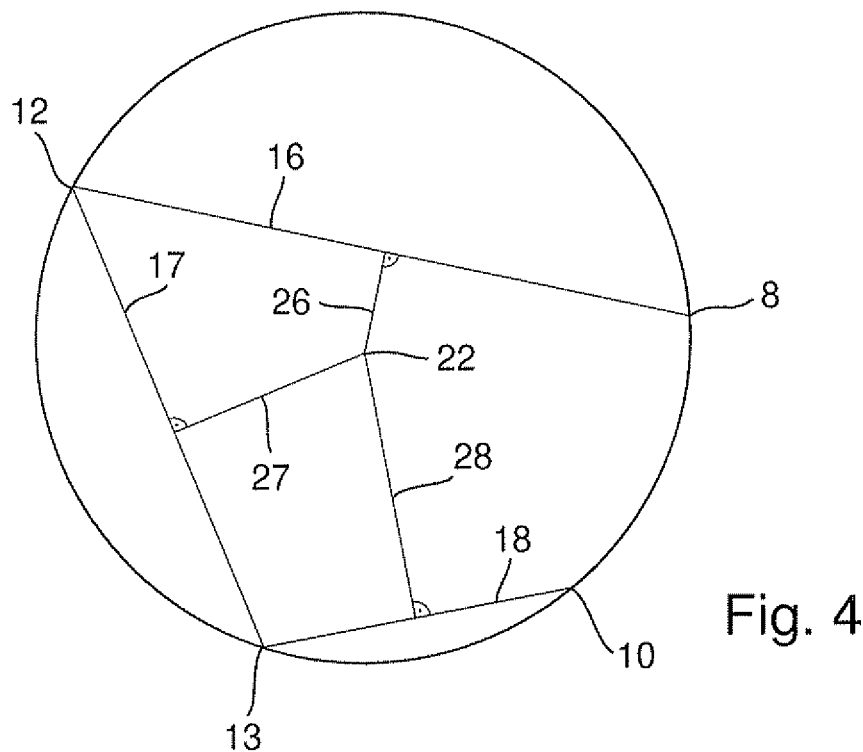
FIG. 4 is an ultrasonic, flow measuring device of the invention in cross section.

FIG. 4 shows the separations 26, 27 and 28 of each subsection 16, 17 and 18 from the measuring tube axis 22. The first straight subsection 16 of the first signal path between first transmitter 8 and the first reflection surface 12 has a first separation 26 from the measuring tube axis. The second straight subsection 17 of the first signal path between the first reflection surface 12 and the second reflection surface 13 has a second separation 27 from the measuring tube axis. The third straight subsection 18 of the first signal path between second reflection surface 13 and first receiver 10 has a third separation 27 from the measuring tube axis. The distances 26, 27 and 28 are measured according to custom via the normals to the straight subsections, which normals intersect the measuring tube axis 22.

All these distances 26, 27 and 28 have in this example of an embodiment values that are other than zero. However, an option is that one or more straight subsections intersect the measuring tube axis. The values of the distances 26, 27 and 28 are here differently large. Here, the first value of the first distance 26 is less than the second value of the second separation 27, which, in turn, is less than the third value of the third distance 28. The separation values yield the differently large values of the lengths of the subsections projected on the measuring tube axis 22, such as explained with reference to FIG. 3.

In the preceding example of an embodiment, all subsections of the first signal path have a length with a value other than zero as projected on the measuring tube axis. However, also ultrasonic, flow measuring devices of the invention can be manufactured, which have one or more subsections of the first signal path with a value of length projected on the measuring tube axis 22 equal to zero. FIG. 7 shows one of these ultrasonic, flow measuring devices of the invention, again, perspectively, in longitudinal, and in cross, section.

Figure 5:
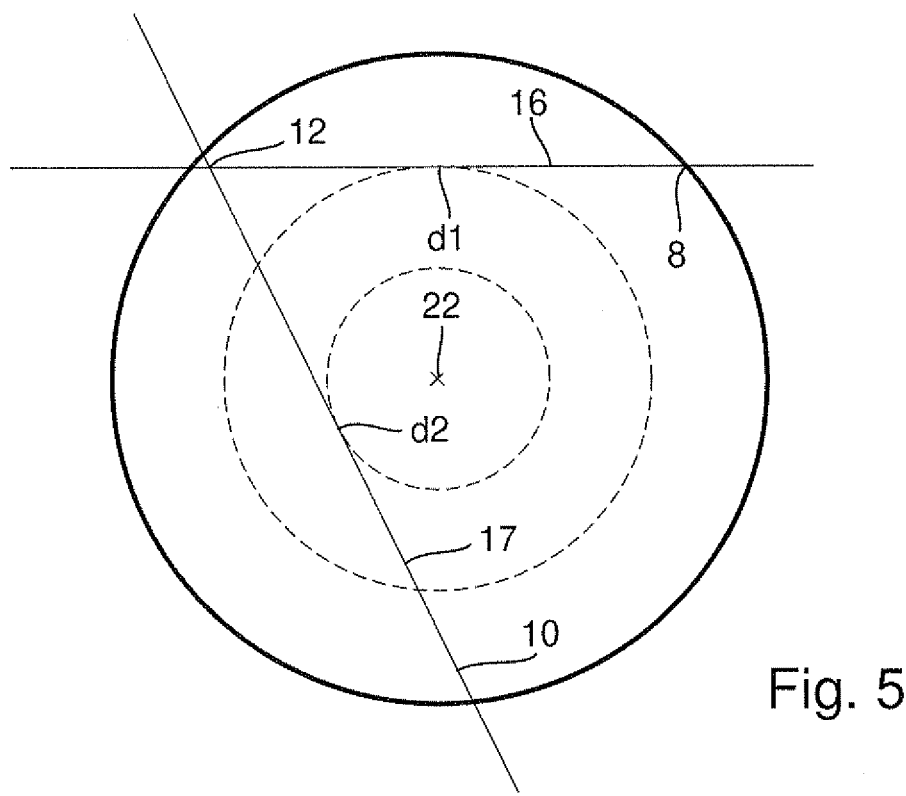
FIG. 5 is an ultrasonic, flow measuring device of the invention in an additional embodiment in cross section.

However, first the measuring method of the invention will be described in greater detail based on FIG. 5. FIG. 5 shows a cross section of a measuring tube 1. Two lines intersect the circumferences of radii d1 and d2 around the measuring tube axis 22, which points into the plane of the drawing. Furthermore, the lines intersect the measuring tube 1 at the points 8, 10 and 12, which here, again, represent the first transmitter 8, the first receiver 10 and the first reflection surface 12. These points limit the first and second straight subsections 16 and 17, which coincide with the lines. Thus, the first straight subsection 16 has the separation of value d1 from the measuring tube axis and the second straight subsection 17 has the separation of value d2 from the measuring tube axis, wherein, in this example of an embodiment, d1 >d2. Each of the straight subsections 16 and 17 lies in a plane parallel to the measuring tube axis. Both planes extend likewise into the plane of the drawing and are therefore only shown by the two lines.

Compared with a multipath, ultrasonic, flow measuring device, such as, for example, that shown in FIG. 1, parallels and differences will now be explained. The individual signal paths (also called measuring paths) of the multipath, ultrasonic, flow measuring device of FIG. 1 lie in planes parallel to one another and to the measuring tube axis and have, in each case, a certain distance from the measuring tube axis. Also the subsections of the first signal path lie in planes parallel to the measuring tube axis, however, these planes intersect in the region of the first reflection surface. Thus, two secants through the measuring tube can be mapped with only a single signal path.

With the travel-time difference method, flow velocities of a fluid flowing through the measuring tube are measured. The flow profile of the fluid is dependent on, among other things, the flow velocity and viscosity of the fluid. In order to register the flow in the case of a multipath, ultrasonic, flow measuring device, a number of flow velocities at a plurality of measuring tube locations are measured with a plurality of measuring paths and taken into consideration, in order to register the flow profile as accurately as possible. The invention now permits registering the flow profile analogously and equally valued, but with an essentially smaller number of ultrasonic transducers as transmitter and/or receiver being needed.

An acoustic signal is transmitted by the first transmitter 8 on the first signal path to the first receiver 10, wherein the acoustic signal on the first signal path from the first transmitter to the first receiver is so reflected on the first reflection surface 12 through the measuring tube that the acoustic signal propagates through the measuring tube on the first signal path along the first straight subsection 16 and on the second straight subsection 17, wherein the first straight subsection 16 has the first separation d1 from the measuring tube axis 22 and wherein the second straight subsection 17 has the second separation d2 from the measuring tube axis 22.

FIG. 6 shows an ultrasonic, flow measuring device of the invention with two signal paths and, consequently, two sets of transmitters and receivers. Besides the first transmitter 8 and the first receiver 10, there are now a second transmitter 9 and a second receiver 11 arranged in bores in the measuring tube 1. The signal of the first signal path leads from the first transmitter 8 to the first reflection surface 12, where it is reflected to the second reflection surface 13, and is there, in turn, reflected to the first receiver 10. Analogously, the acoustic signal moves along the second signal path from the second transmitter 9 via the third reflection surface 14 and the fourth reflection surface 15 to the second receiver 11. Between the first transmitter 8 and the first reflection surface 12 is located the first straight subsection of the first signal path. Between the first reflection surface 12 and the second reflection surface 13, the acoustic signal moves along the second straight subsection 17 of the first signal path. Finally, the second reflection surface 13 and the first receiver 9 border the third straight subsection 18 of the first signal path. Equal behavior is found in the case of the second signal path: Between the second transmitter and the third reflection surface 14 is located the first straight subsection 19 of the second signal path; between the third reflection surface 14 and the fourth reflection surface 15 is located the second straight subsection 20 of the second signal path; between the fourth reflection surface 15 and the second receiver 11 is located the third straight subsection 21 of the second signal path. All transmitters and receivers 8 to 11 are, as ultrasonic transducers, operable both as transmitters as well as also as receivers. All reflection surfaces 12 to 15 are arranged in the measuring tube 1. They have, in each case, surface normals (not shown), which are not perpendicular to the measuring tube axis 22. The first signal path and the second signal path extend helically around the measuring tube axis and as mirror images of one another in the measuring tube. Lying in the mirror plane is the measuring tube axis 22. Therefore, all statements made concerning the first signal path hold analogously for the second signal path.

This arrangement offers advantages in the case of non-rotationally symmetric flow profiles and/or especially in the case of flows extending helically around the measuring tube axis. If a flow has a flow profile with directional components extending tangentially to the measuring tube wall and therewith perpendicular to the the measuring tube axis, a single helical signal path extending around the measuring tube axis would extend with or counter to these directional components, which could result in a measurement error. With a second signal path extending counter to the first signal path helically around the measuring tube axis and entering into the calculating of the flow with the same weighting, this error is eliminated. The next FIG. provides an alternative to this solution.

The first separation 26 of the first straight subsection of the first signal path from the measuring tube axis is other than zero and other than the second separation 27 of the second straight subsection of the first signal path from the measuring tube axis, which is, in turn, likewise other than zero and other than the third separation 28 of the third straight subsection of the first signal path from the measuring tube axis, which is, in turn, likewise other than zero and other than the first separation 26 of the first straight subsection of the first signal path from the measuring tube axis.

Since there are not a plurality of straight subsections of the first signal path with the same separation from the measuring tube axis, a summing of the values of the lengths of the straight subsections of the first signal path as projected on the measuring tube axis is not appropriate. Here, the first value of the length of the first straight subsection of the first signal path as projected on the measuring tube axis is other than zero and other than the second value of the length of the second straight subsection of the first signal path as projected on the measuring tube axis, and, in turn, the second value of the length of the second straight subsection of the first signal path is other than zero and other than the third value of the length of the third straight subsection of the first signal path as projected on the measuring tube axis, and, in turn, the third value of the length of the third straight subsection of the first signal path is other than zero and other than the first value of the first length of the first straight subsection of the first signal path as projected on the measuring tube axis. The lengths are not shown, for reasons of perspicuity. They have predetermined values, which are ascertained via a predetermined calculational formula as a function of the respective separations of the straight subsections. They correspond here to normalized weighting factors of a comparable multipath, ultrasonic, flow measuring device. They are obtained by method steps as follows:

First, there occurs the selecting of a number greater than one of straight subsections of the first signal path, which have mutually differing distances from the measuring tube axis. This happens analogously to the development of a multipath measuring device. The more measuring paths, respectively subsections, of the first signal path with different distances from the measuring tube axis, the better is the flow profile traversed with measuring paths, respectively subsections, of the first signal path and the more exactly can the flow be determined, since, in the travel time difference principle, the flow velocities are measured and the flow, especially the volume flow, in the measuring tube cross section is extrapolated and can be averaged over a higher number of measuring paths. In the case of the ultrasonic, flow measuring device of the invention, it is necessary, other than in the case of a multipath measuring device, to take into consideration the signal loss from the reflections and, in given cases, disturbances by tube waves, which are body sound waves transmitted via the measuring tube, for example, from the transmitter to the receiver. In the case of too many subsections of the first signal path, there is the danger of too small signal energy of the acoustic signal on the signal path to the receiver. This presents, thus, an optimizing problem between usable signal energy and accuracy.

Then, the distances of the straight subsections from the measuring tube axis are established. This happens, for example, by calculating by means of appropriate methods, such as the Gauss-Jacobi method, or by simple reading from tables, such as indicated, for example, in the above paper of Tresch, Staubli and Gruber.

In a third method step, the values of the lengths of the straight subsections are ascertained as a function of the number of straight subsections with the same separation from the measuring tube axis and the respective separation from the measuring tube axis, here by ascertaining weighting factors for measuring paths of a multipath, ultrasonic, flow measuring device for flow measurement according to a predetermined calculational formula, here, for example, with the Gauss-Jacobi method, as a function of the distances of the measuring paths from the measuring tube axis, which distances from the measuring tube axis are the same as those of the straight subsections. A dividing of the weighting factors by the number of measuring paths with the same separation from the measuring tube axis is logically not required in the illustrated example of an embodiment. If, such as here, the weighting factors are calculated with the Gauss-Jacobi method, respectively read from a table, they are then normalized with predetermined normalizing factors $k_i=\sqrt{1-(d_i/D)^2}$, wherein $d_i$ stands for the distances of the subsections, respectively the measuring paths, from the measuring tube axis and D for the diameter of the measuring tube. The normalizing is naturally only necessary, when the weighting factors have not already been ascertained in a manner required for the invention. The invention solves the problem of weighting the measuring paths, respectively the subsections, with different separations from the measuring tube axis geometrically for determining the flow. To be taken into consideration are, besides the weightings, the values of the projected lengths of the measuring paths and their distances from the measuring tube axis. The Gauss-Jacobi method is based on the assumption that all measuring paths extend in the measuring tube at the same angle to a plane, in which the measuring tube axis lies and which extends orthogonally to the planes, in which, in turn, the individual measuring paths lie. Furthermore, the measuring tube has a circularly round cross section. The distances of the individual measuring paths from the measuring tube axis lead, consequently, to their projected lengths on the measuring tube axis. Correspondingly, the weighting factors must still be normalized with precisely these projected lengths on the measuring tube axis. Since in given cases, two measuring paths have the same separation from the measuring tube axis, and, thus, are taken into consideration twice with the same weighting factor in the flow determination, the obtained value for the projected length of the corresponding subsection of the flow measuring device of the invention must still be divided by two. The number of measuring paths is, thus, naturally to be taken into consideration in the normalizing.

Then, the values of the lengths of the straight subsections with the same distances from the measuring tube axis are established by dividing the results among the respectively provided number of straight subsections with the same distances from the measuring tube axis. Also this step can be omitted here.

If, now, the number of subsections, their distances from the measuring tube axis and their projected lengths on the measuring tube axis are established, the reflection surfaces in the measuring tube are so applied that the acoustic signal on the path from the first transmitter to the first receiver is so reflected on the reflection surfaces that the corresponding straight subsections with the distances and the calculated values of the lengths projected on the measuring tube axis arise.

If a number of subsections of a signal path are provided with the same distance from the measuring tube axis, the values of their lengths projected on the measuring tube axis must naturally be matched. Their sum must be proportional to the, in given cases, normalized weighting factors.

The first separation is selected to be less than the second separation, which, in turn, is less than the third separation. It follows therefrom that here in this example of an embodiment, the first value of the projected length of the first subsection of the first signal path is greater than the second value of the length of the second subsection of the first signal path as projected on the measuring tube axis, which, in turn, is greater than the third value of the length of the third subsection of the first signal path as projected on the measuring tube axis. The first, the second and the third subsections extend, in each case, skew to one another in the measuring tube. Naturally, other reflection surfaces can be provided in the measuring tube, on which the acoustic signal and/or the acoustic signals of the first and/or of the second acoustic signal path are reflected. It is not absolutely required that these have a non-perpendicular surface normal to the measuring tube axis. Also, the acoustic signal can propagate on a signal path sectionally perpendicular to the measuring tube axis in the measuring tube extend, in which case this subsection then has a length projected on the measuring tube axis of value zero. The path of the signal along this subsection does not, however, help for flow measurement by means of the travel-time difference method, but, instead, is utilized, for example, for determining the velocity of sound. In order to compensate twist effects, also here two oppositely extending subsections can be provided. To this point in time, subsections were shown, which exhibited a separation from the measuring tube axis other than zero; this is, however, no feature of the invention. Also, calculating the said weighting factors by means of the Gauss-Jacobi— or the OWICS method is not absolutely required. If other methods for calculating weighting factors for mapping flow conditions in the measuring tube are known, these are likewise applicable to the invention. To be taken into consideration, in given cases, are the values of the projected lengths of the measuring paths and their distances from the measuring tube axis.

FIG. 7 shows another embodiment of the invention. The acoustic signal along the first signal path 6 is radiated into the measuring tube by the first transmitter 8 with a direction vector perpendicular to the measuring tube axis. Along the path to the first receiver 10, it is reflected on five reflection surfaces, in each case, once, before it, again with a direction vector perpendicular to the measuring tube axis, strikes the first receiver 10. Transmitter 8 and receiver 10 can be arranged outside of the measuring tube 1, for example, on its outer wall. Involved is, thus, a clamp-on type, ultrasonic, flow measuring device. Other advantages will become evident from the type of signal guidance along the first signal path. Thus e.g., when the radiation is brought in perpendicularly, the known problem in the case of usual clamp-on systems of the temperature- and/or medium dependence of the angle of incidence is absent.

As also already explained in connection with the other examples of embodiments, an acoustic signal is first sent by the transmitter to the receiver and then from the receiver to the transmitter, in order to obtain a travel-time difference and in order, finally, to ascertain in known manner the flow rate through the measuring tube.

The invention claimed is:

1. A method for manufacturing an ultrasonic, flow measuring device, which includes a measuring tube having a straight measuring tube axis, a first transmitter for sending an acoustic signal on a first signal path, a first receiver for receiving the acoustic signal on the first signal path and at least a first reflection surface for reflecting the first acoustic signal on the first signal path, comprising the steps of:

selecting more than one straight subsections of the first signal path, which should have different distances from the measuring tube axis;

establishing the distances of the straight subsections from the measuring tube axis;

calculating values of lengths of the straight subsections, as projected on the measuring tube axis, as a function of the number of straight subsections with the same distance from the measuring tube axis and the respective distances from the measuring tube axis, wherein projection of a subsection on the measuring tube axis includes projection of said subsection onto a plane parallel to the measuring tube axis and projection of said projected subsection on the measuring tube axis;

inserting at least a first reflection surface in the measuring tube such that the acoustic signal on the path from the first transmitter to the first receiver is so reflected on at least the first reflection surface that the first signal path comprises the straight subsections with the selected distances and the calculated values of the lengths as projected on the measuring tube axis;

wherein the values of the lengths of the straight subsections as projected on the measuring tube axis are calculated as a function of the number of straight subsections with the same distance from the measuring tube axis, and the respective distances from the measuring tube axis, in the following way: ascertaining weighting factors for measuring paths of a multipath, ultrasonic, flow measuring device for flow measurement according to a predetermined calculation formula as a function of the distances of the measuring paths from the measuring tube axis, which distances from the measuring tube axis are the same as those of the straight subsections;

dividing the weighting factors by the number of measuring paths with the same distance from the measuring tube axis; and establishing the values of the lengths of the straight subsections, as projected on the measuring tube axis, having the same distances from measuring tube axis, by dividing the results among the respectively provided number of straight subsections with the same distances from measuring tube axis.

2. The method as claimed in claim 1, wherein: the predetermined calculational formula is the OWVICS— or the Gauss-Jacobi method.

3. The method as claimed in claim 2, wherein:

after the method step, dividing the weighting factors by the number of measuring paths with the same distance from the measuring tube axis; and before the method step, establishing the values of the lengths of the straight subsections, as projected on the measuring tube axis, having the same distances from the measuring tube axis, by dividing the results among the respectively provided number of straight subsections with the same distances from measuring tube axis;

the following method step is performed normalizing the results with predetermined normalizing factors as a function of the lengths of the measuring paths as projected on the measuring tube axis and/or as a function of the distances from measuring tube axis.

4. The method as claimed in claim 3, wherein:

the norrmalizing of the results occurs with predetermined normalizing factors in the following way:

multiplying with the factor, $k_i = \sqrt{1-(d_i/D)^2}$, wherein $d_i$ stands for the distance from the measuring tube axis and D for the diameter of the measuring tube.

5. The method as claimed in claim 1, wherein:

the at least a first reflection surface in the measuring tube is so applied that the acoustic signal on the first signal path from the first transmitter to the first receiver is so reflected on the at least a first reflection surface that the acoustic signal propagates through the measuring tube on the first signal path along at least a first and at least a second straight subsection;

the first straight subsection has a first distance from the measuring tube axis and the second straight subsection has a second distance from the measuring tube axis;

the first separation differs from the second separation; and the sum of all lengths of all subsections of the first signal path as projected on the measuring tube axis and having the first distance from the measuring tube axis has a predetermined first value and the sum of all lengths of all subsections of the first signal path as projected on the measuring tube axis and having the second distance from the measuring tube axis has a predetermined second value, wherein the first value differs from the second value, wherein the first and second values are other than zero.

6. The method as claimed in claim 5, wherein:

the at least a first reflection surface is so inserted into the measuring tube that the acoustic signal on the first signal path is reflected on the first reflection surface;

the acoustic signal incident on the first reflection surface propagates along the first straight subsection; and the acoustic signal reflected on the first reflection surface propagates along the second straight subsection.

7. The method as claimed in claim 1, wherein:
the ultrasonic, flow measuring device includes a plurality of reflection surfaces for reflection of the first acoustic signal on the first signal path.

8. The method as claimed in claim 1, wherein: the first transmitter, the first receiver and the first reflection surface are so oriented relative to one another and arranged in or on the measuring tube that the acoustic signal on the first signal path from the first transmitter to the first receiver propagates helically around the measuring tube axis.

9. The method as claimed in claim 1, wherein:
the ultrasonic, flow measurement device includes at least one additional, second transmitter for sending an acoustic signal on a second signal path, at least one additional, second receiver for receiving the acoustic signal on the second signal path and at least one additional reflection surface for reflecting the acoustic signal on the second signal path.

10. The method as claimed in claim 9, wherein:
the second signal path is produced according to the method steps of claim 1.

11. The method as claimed in claim 9, wherein:
the reflection surfaces are so applied that the two signal paths extend as mirror images of one another in the measuring tube.

12. The method as claimed in claim 1, wherein:
said ultrasonic, flow measuring device includes one or more concave mirrors, on which the reflection surfaces are arranged.

13. An ultrasonic, flow measuring device obtainable by a method according to claim 1.

* * * * *